United States Patent
Zhong et al.

(10) Patent No.: US 11,586,250 B2
(45) Date of Patent: Feb. 21, 2023

(54) ELECTRONIC DEVICE AND CONTROL METHOD

(71) Applicant: Lenovo (Beijing) Co., Ltd., Beijing (CN)

(72) Inventors: Like Zhong, Beijing (CN); Tianshui Tan, Beijing (CN); Lei Wu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 203 days.

(21) Appl. No.: 17/030,213

(22) Filed: Sep. 23, 2020

(65) Prior Publication Data

US 2021/0089086 A1    Mar. 25, 2021

(30) Foreign Application Priority Data

Sep. 24, 2019   (CN) ................. 201910907906.4

(51) Int. Cl.
*G06F 1/16* (2006.01)
(52) U.S. Cl.
CPC .......... *G06F 1/1652* (2013.01); *G06F 1/1626* (2013.01); *G06F 1/1656* (2013.01)
(58) Field of Classification Search
CPC .... G06F 1/1652; G06F 1/1626; G06F 1/1656; G06F 1/1677
See application file for complete search history.

(56) References Cited

U.S. PATENT DOCUMENTS

| | | | |
|---|---|---|---|
| 2014/0380186 A1* | 12/2014 | Kim ............. | G06F 1/1677 715/746 |
| 2015/0325804 A1* | 11/2015 | Lindblad ........ | G06F 3/0416 313/511 |
| 2015/0370317 A1* | 12/2015 | Cha .............. | G06F 1/1637 345/676 |
| 2016/0162241 A1* | 6/2016 | An ............... | G06F 1/1641 345/1.3 |
| 2017/0280570 A1* | 9/2017 | Li ................ | G06F 1/1652 |
| 2017/0287385 A1* | 10/2017 | Lian ............. | G06F 1/1616 |
| 2018/0343754 A1* | 11/2018 | Lee .............. | G06F 1/1624 |
| 2020/0371733 A1* | 11/2020 | Rao ............. | B60K 35/00 |
| 2020/0401263 A1* | 12/2020 | Chung .......... | G06F 1/1616 |
| 2021/0041912 A1* | 2/2021 | Eom ............ | H04M 1/0216 |

FOREIGN PATENT DOCUMENTS

| | | |
|---|---|---|
| CN | 106463079 A | 2/2017 |
| CN | 207603695 U | 7/2018 |
| CN | 109040359 A | 12/2018 |

\* cited by examiner

*Primary Examiner* — Abhishek M Rathod
(74) *Attorney, Agent, or Firm* — Anova Law Group, PLLC

(57) ABSTRACT

An electronic device includes a body, a display screen, and a support component. The display screen includes a first portion and a second portion. A display screen surface of the first portion covers the body, and the second portion includes a flexible area. The support component is connected to a display screen surface of the flexible area. The support component is configured to change shape as the flexible area deforms to support the flexible area.

11 Claims, 7 Drawing Sheets

ELECTRONIC DEVICE AND CONTROL METHOD

CROSS-REFERENCE TO RELATED APPLICATION

This application claims priority to Chinese Patent Application No. 201910907906.4, filed on Sep. 24, 2019, the entire content of which is incorporated herein by reference.

TECHNICAL FIELD

The present disclosure relates to an electronic device and a control method.

BACKGROUND

Functions of mobile electronic devices have improved rapidly. Users also have high expectations for the functions and usability of mobile electronic devices.

Often, the size of the mobile electronic device cannot match the size of a user's hand.

SUMMARY

Embodiments of the present disclosure provide an electronic device including a body, a display screen, and a support component. The display screen includes a first portion and a second portion. A display screen surface of the first portion covers the body, and the second portion includes a flexible area. The support component is connected to a display screen surface of the flexible area. The support component is configured to change shape as the flexible area deforms to support the flexible area.

Embodiments of the present disclosure provide a control method for managing displays of an electronic device. The method includes obtaining a bending angle of a flexible area by an angle measurement assembly and adjusting a display strategy of a display screen based on the bending angle. The display strategy includes at least one of a display area, a display effect of an image in the display area, or a display style of a user interface.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Figure 1A:
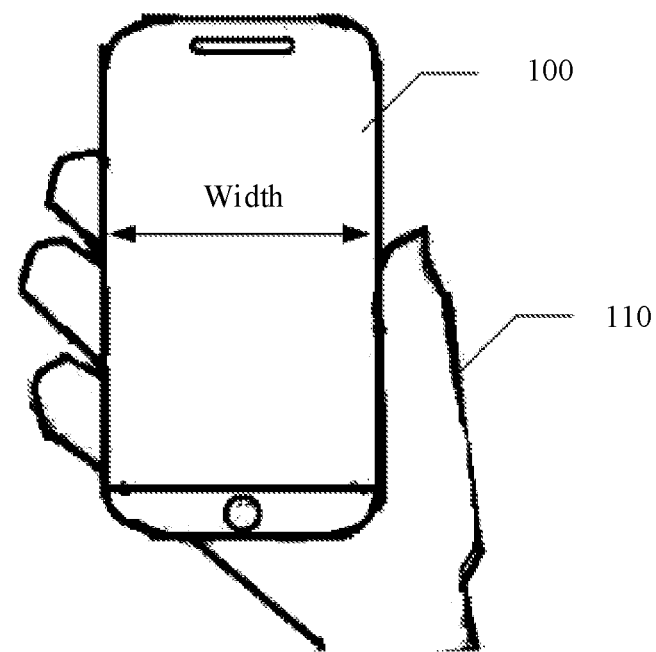
FIGS. 1A and 1B illustrate schematic application scenes of an electronic device according to some embodiments of the present disclosure.

Embodiments of the present disclosure are described with reference to accompanying drawings. This description is merely exemplary and does not limit the scope of the present disclosure. In the following description, many details are provided to comprehensively understand embodiments of the present disclosure. However, one or more embodiments may be implemented without these details. In the following description, well-known structure and technology are omitted to avoid unnecessarily obscuring the concept of the present disclosure.

The terms used here are only for describing specific embodiments and are not intended to limit the present disclosure. The terms "including," "containing," etc., used herein indicate the existence of the described features, steps, operations, and/or components, but do not exclude the existence or addition of one or more other features, steps, operations, or components.

All terms (including technical and scientific terms) used herein have the meanings commonly understood by those skilled in the art, unless otherwise defined. The terms used herein should be interpreted as having meanings consistent with the context of this specification and should not be interpreted in an idealized or overly rigid manner.

An expression similar to "at least one of A, B, and C" should be interpreted according to the meaning of the expression commonly understood by those skilled in the art (for example, "a system including at least one of A, B, and C" should include but is not limited to a system including A alone, a system including B alone, a system including C alone, a system including A and B, a system including A and C, a system including B and C, and/or a system including A, B, and C). An expression similar to "at least one of A, B, or C" should be interpreted according to the meaning of the expression commonly understood by those skilled in the art (for example, "a system including at least one of A, B, or C" should include but is not limited to a system including A alone, a system including B alone, a system including C alone, a system including A and B, a system including A and C, a system including B and C, and/or a system including A, B, and C).

Some block diagrams and/or flowcharts are shown in the drawings. Some blocks or a combination thereof in the block diagrams and/or flowcharts can be implemented by computer program instructions. These computer program instructions can be provided to the processor of a general-purpose computer, a special-purpose computer, or other programmable data processing device, so that these instructions can be used to implement functions/operations described in these block diagrams and/or flowcharts when executed by the processor. The technology of the present disclosure may be implemented in the form of hardware and/or software (including firmware, microcode, etc.). In addition, the technology of the present disclosure may be in the form of a computer program product in a computer-readable storage medium storing the instructions. The computer program product may be used by an instruction execution system or in combination with the instruction execution system.

Embodiments of the present disclosure provide an electronic device. The electronic device may include a body, a display screen, and a support component. The display screen may include a first portion and a second portion. A display screen surface of the first portion may cover the body. The second portion may include a flexible area. The support component may be connected to a display screen surface in the flexible area. The support component may be configured to change shape as the flexible area deforms to support the flexible area.

Figure 1B:
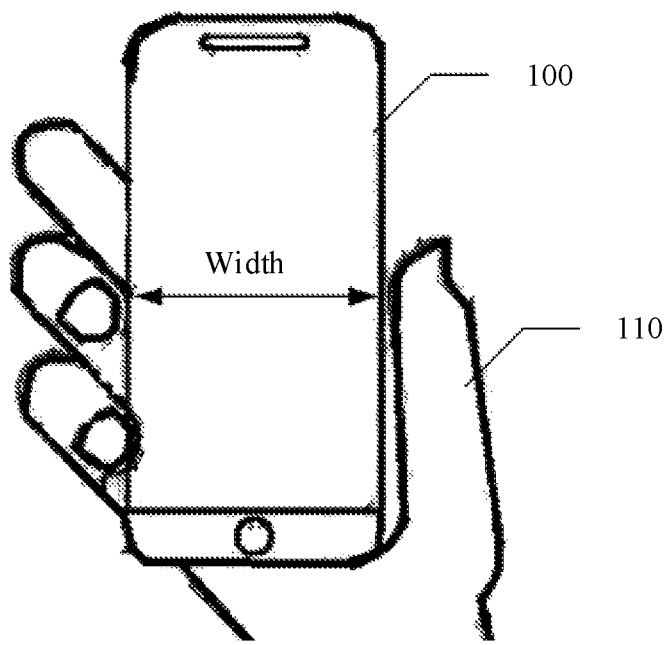

FIGS. 1A and 1B illustrate schematic application scenes of an electronic device 100 according to some embodiments of the present disclosure. FIGS. 1A and 1B show merely examples that apply the scenes of the present disclosure to help those skilled in the art to understand the technical contents of the present disclosure. However, embodiments of the present disclosure may also be applied to another device, system, environment, or scene.

As shown in FIG. 1A, in the application scene, the electronic device 100 and a user's hand 110 are included. Since the hand 110 is relatively small, sidewalls at both ends of the electronic device 100 may not be tightly held, such that the electronic device 100 may easily fall off.

In some embodiments, a width of the electronic device 100 may be changed to a size that matches the size of the hand 110. As shown in FIG. 1B, the width of the electronic device 100 is reduced, such that the hand 110 is able to hold the sidewalls of both ends of the electronic device 100. Thus, the electronic device 100 may not easily fall off.

Figure 2:
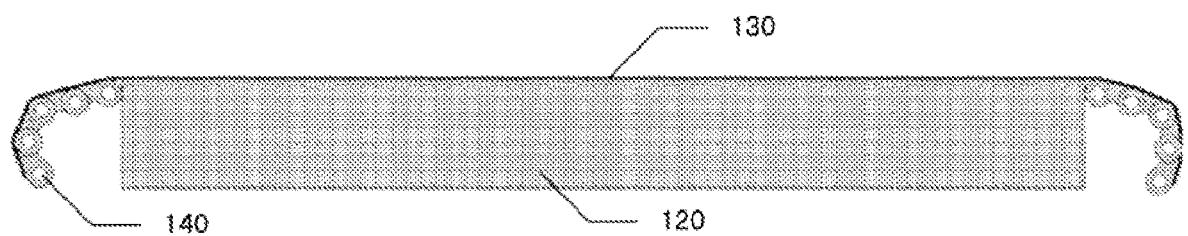
FIG. 2 illustrates a schematic diagram showing the electronic device according to some embodiments of the present disclosure.

FIG. 2 illustrates a schematic diagram showing the electronic device 100 according to some embodiments of the present disclosure.

As shown in FIG. 2, the electronic device 100 includes a body 120, a display screen 130, and a support component 140. The display screen 130 includes a first portion and a second portion. A display screen surface of the first portion covers the body 120. The second portion includes a flexible area. The support component 140 is connected to a display screen surface in the flexible area. The support component 140 is configured to change shape as the flexible area deforms to support the flexible area.

In some embodiments, the second portion of the display screen 130 of the electronic device may include the flexible area. The user may apply an external force to the second portion to adjust a bending angle of the flexible area, such that the size of the electronic device 100 may match the size of a user's operating body. The size of the electronic device 100 may be flexibly adjusted to improve user experience.

In some embodiments, the body 120, for example, may form an accommodation space. Components, such as a motherboard, a power source, a camera, etc., of the electronic device 100 may be arranged in the accommodation space.

Figure 3:
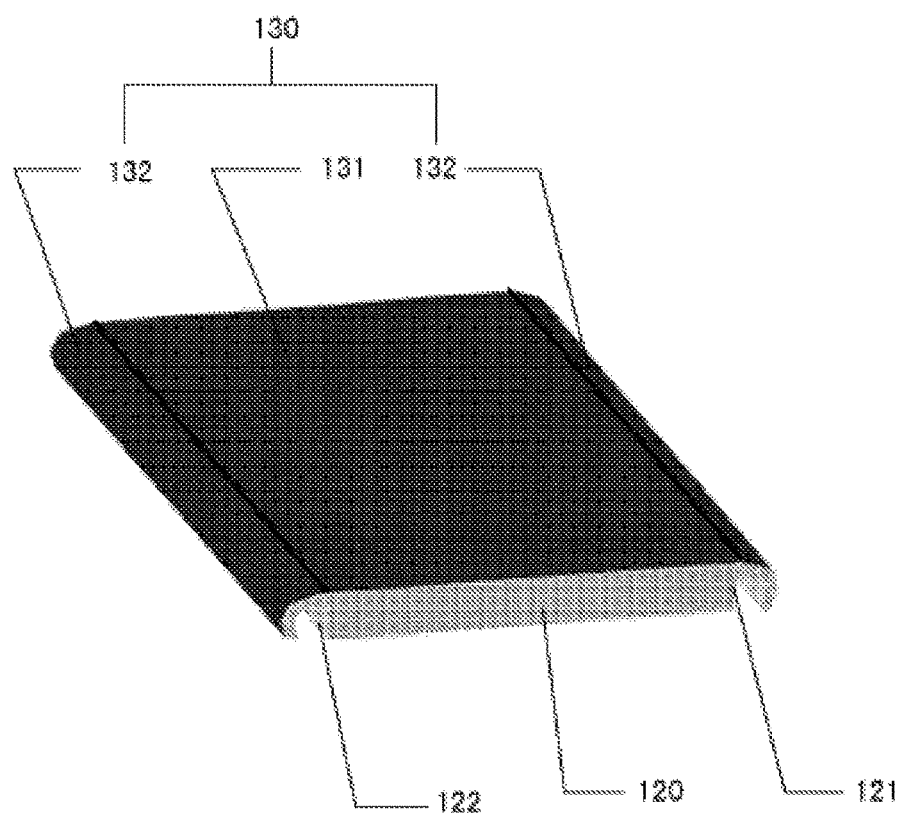
FIG. 3 illustrates a schematic perspective diagram showing the electronic device according to some embodiments of the present disclosure.

FIG. 3 illustrates a schematic perspective diagram showing the electronic device 100 according to some embodiments of the present disclosure.

As shown in FIG. 3, the display screen 130 includes a first portion 131 and a second portion 132. The first portion 131 covers the body 120. The second portion includes a flexible area.

As shown in FIG. 3, the body 120 includes a first surface and two sidewalls opposite to each other. The two sidewalls include a first sidewall 121 and a second sidewall 122. The first portion 131 of the display screen 130 covers the first surface. The second portion 132 corresponds to the first sidewall 121 and the second sidewall 122.

In some embodiments, the whole second portion 132, for example, may include the flexible area, or a part of the second portion 132 may include the flexible area. Embodiments are described in connection with FIGS. 4A, 4B, and 4C to illustrate that the part of the second portion 132 including the flexible area.

Figure 4A:
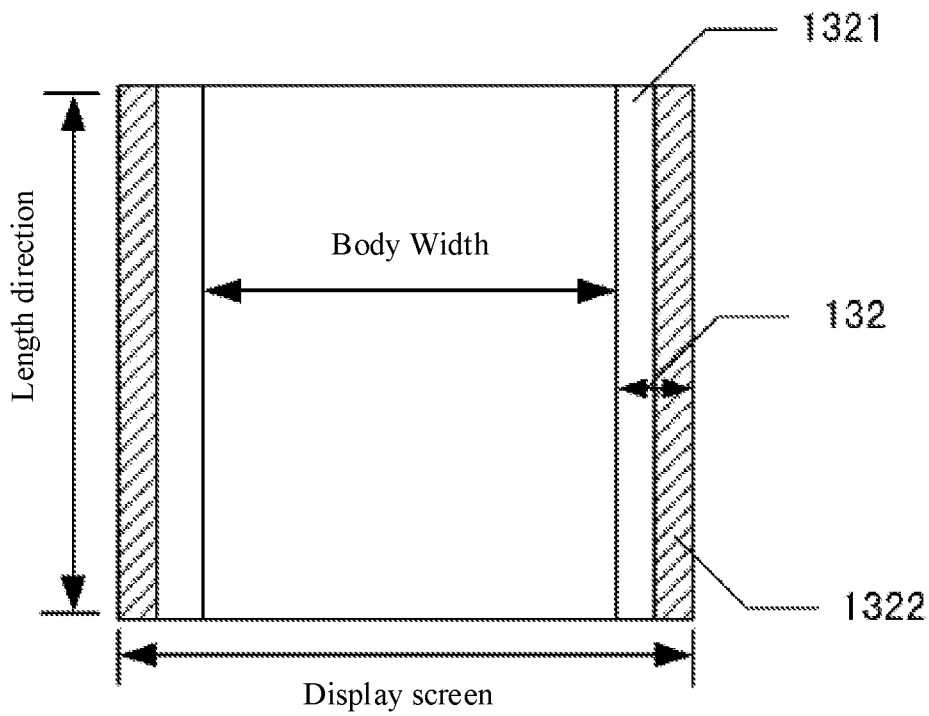
FIGS. 4A, 4B, and 4C illustrate schematic diagrams showing that a part of a second portion is a flexible area according to some embodiments of the present disclosure.
Figure 4B:
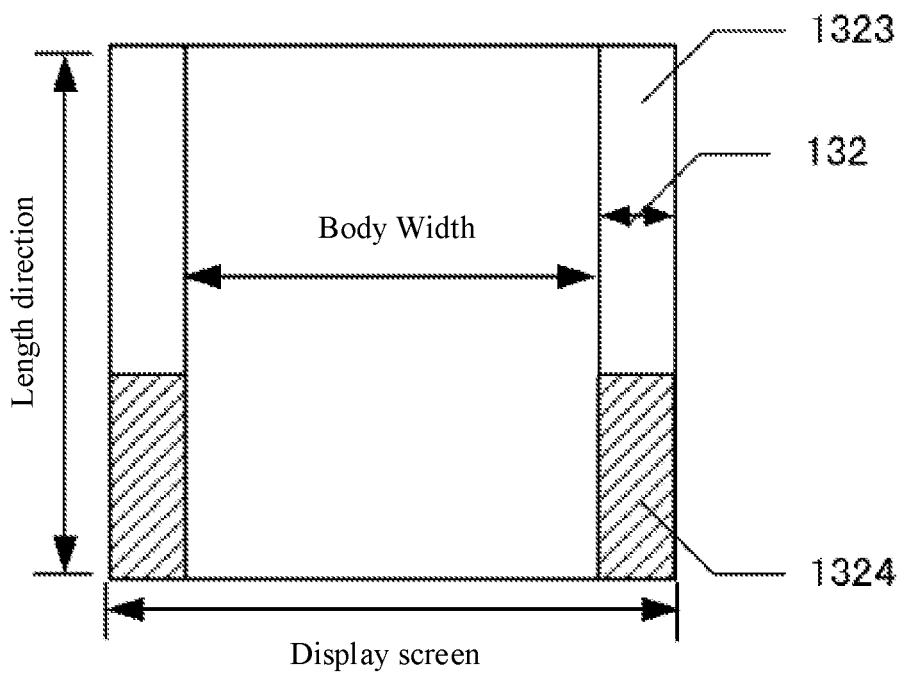
Figure 4C:
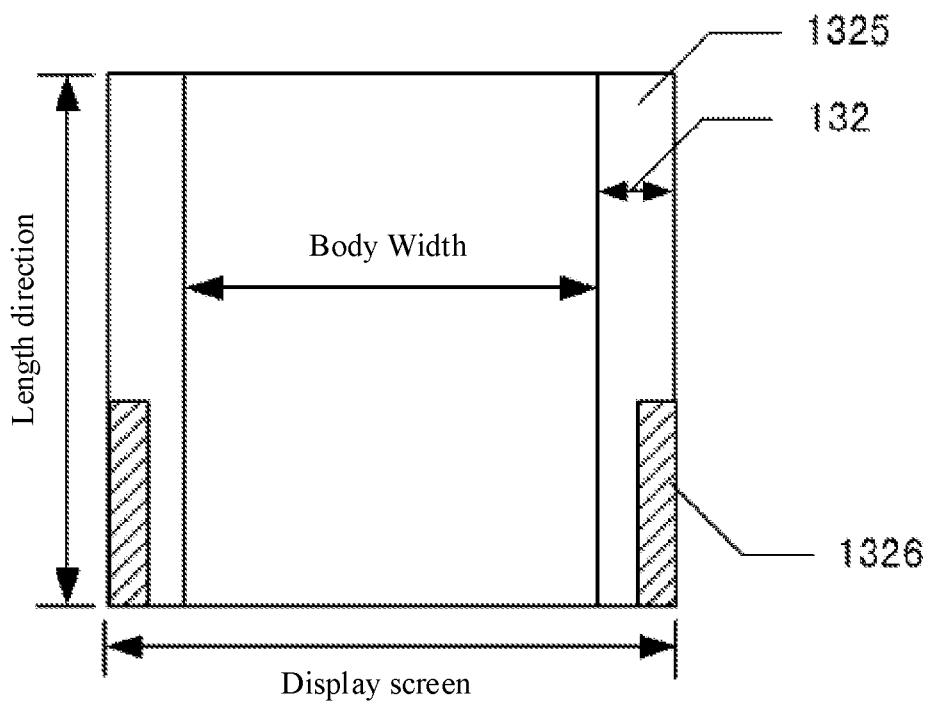

FIGS. 4A, 4B, and 4C illustrate schematic diagrams showing that a part of the second portion 132 includes the flexible area according to some embodiments of the present disclosure.

As shown in FIG. 4A, a part of the second portion 132 includes the flexible area. For example, areas at both sides along a width direction of the electronic device 100 of the second portion 132 includes the flexible area, and other areas of the second portion 132 may include a non-flexible area. For example, a first sub-portion 1321 of the second portion 132 may include the non-flexible area, and a second sub-portion 1322 of the second portion 132 may include the flexible area.

As shown in FIG. 4B, a part of the second portion 132 includes the flexible area. For example, the part of the second portion 132 along a length direction of the electronic device 100 includes the flexible area, and other areas of the second portion 132 include the non-flexible area. For example, a first sub-portion 1321 of the second portion 132 includes the non-flexible area, and a second sub-portion 1322 of the second portion 132 includes the flexible area. A first sub-portion 1323, for example, is located at the bottom of the display screen 130. A second sub-portion 1324, for example, is located at the top of the display screen 130.

As shown in FIG. 4C, a part of the second portion 132 includes the flexible area. For example, an edge area at the bottom of the second portion 132 includes the flexible area, and other areas include the non-flexible area. A first sub-portion 1325 includes the non-flexible area, and a second sub-portion 1326 includes the flexible area.

In some embodiments, the support component 140 may be connected to the surface of the display screen at the flexible area. For example, the whole second portion 132 may be flexible. As shown in FIG. 2, the support component 140 is connected to the surface of the display screen at the second portion 132 of the display screen to support the shape of the second portion 132 of the display screen.

In some embodiments, the support component 140, for example, may be connected to the surface of the display screen by glue.

In some embodiments, the size of the electronic device 100 may change under the external force to match the operating body of the user. The flexible area of the electronic device 100 may have a small deformation, such that the display screen may not be damaged by bending the flexible area. Thus, the lifetime of the electronic device 100 may be extended.

In some embodiments, the electronic device 100 may further include an angle measurement assembly and a control assembly. The angle measurement assembly may be configured to measure a bending angle of the flexible area. The control assembly may be configured to adjust a display strategy of the display screen according to the bending angle. The display strategy may include a display area, a display effect of an image of the display area, and a display style of a user interface, etc.

In some embodiments, the electronic device 100 may adjust the display strategy according to the bending angle, such that the user may conveniently watch the display content of the display screen, and the display area of the display screen may be used appropriately. As such, the user experience may further be improved.

In some embodiments, the display area, for example, may be a display screen area configured for display.

For example, the flexible area may have a smaller bending angle in a first status than in a second status. Thus, the width of the electronic device 100 may be larger in the first status than in the second status. In some embodiments, in the first status, the display screen 130, for example, may include 9/10 area as the display area, which may be configured to display contents. The flexible area of the display screen 130 may be bent away from the display screen 130, such that the electronic device 100 may be in the second status. In the second status, the display screen, for example, may include 8/10 area as the display area.

In some embodiments, the display effect of an image of the display area, for example, may include a size of the image, a shape of the image, and a distance between adjacent images, etc.

In some embodiments, the display style of the user interface may include a first display style and a second display style. The first display style may match a user feature of a first user type, and the second display style may match a user feature of a second user type. When the first user type uses the electronic device, the bending angle may be smaller than a first preset value. When the second user type uses the electronic device, the bending angle may be larger than a second preset value.

In some embodiments, the display style of the electronic device may match the user feature, which may further improve the user experience.

For example, when the bending angle of the electronic device is smaller than the first preset value, the operating body of the user using the electronic device may be determined to be relatively large. The user having a relatively large operating body may be the first user type. The user feature of the first user type, for example, may be older than 16. Therefore, the display style matching the user feature of the first user type, for example, may include a simple style. When the bending angle of the electronic device is larger than the second preset value, the operating body of the user using the electronic device may be determined to be relatively small. The user having a relatively small operating body may be the second user type. The user feature of the second user type, for example, may be younger than 16. The display style matching the user feature of the second user type, for example, may include a cute style.

In some embodiments, for example, when the bending angle of the flexible area measured by the angle measurement assembly is relatively small, the control assembly may control the display screen to display with the first display style. When the bending angle of the flexible area measured by the angle measurement assembly is relatively large, the control assembly may control the display screen to display with the second display style.

The display styles of the user interface may not be limited to two and may not be limited to the above simple style and cute style. Those skilled in the art may set the number of the display styles and display styles for the user interface according to the actual needs.

In some embodiments, the angle measurement assembly, for example, may include any assembly that can measure the angle. For example, the angle measurement assembly may include an angle sensor, or the angle measurement assembly may measure a movement distance of a fixed point of the flexible area to determine the bending angle of the flexible area.

In some embodiments, the angle measurement assembly, for example, may include a magnetic component and a measurement device. The magnetic component may be configured to generate a magnetic field. The measurement device may be configured to measure the magnetic induction intensity of the magnetic field generated by the magnetic component at a specific position and determine the bending angle of the flexible area according to the magnetic induction intensity. The magnetic component may be arranged in the flexible area. The measurement device may be arranged at a fixed position. The fixed position may include a position at the body, which may not be affected by the deformation of the flexible area. Otherwise, the magnetic component may be arranged at the fixed position, and the measurement device may be arranged in the flexible area.

Figure 5:
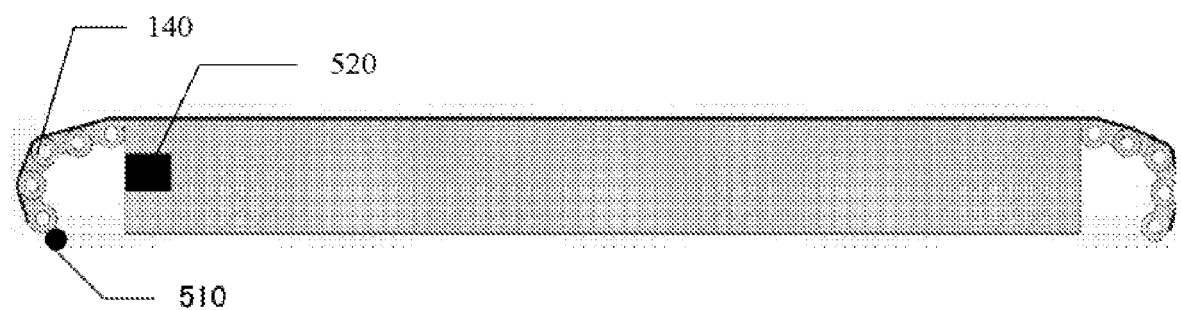
FIG. 5 illustrates a schematic diagram showing positions of a magnetic component and measurement device according to some embodiments of the present disclosure.

FIG. 5 illustrates a schematic diagram showing the positions of a magnetic component 510 and measurement device 520 according to some embodiments of the present disclosure.

As shown in FIG. 5, the angle measurement assembly may include the magnetic component 510 and the measurement device 520. The magnetic component 510, for example, may be arranged at the end of the support component 140. The measurement device 520, for example, may be arranged at the fixed position at the body 120. For example, the measurement device 520 may be arranged in the accommodation space formed in the body 120 and fixed on the sidewall.

When the support component 140 bends, the position of the magnetic component 510 relative to the measurement device 520 may change as the support component 140 bends. As such, the magnetic induction intensity generated by the magnetic component 510 to the measurement device 520 may change. The measurement device 520, for example, may include a magnetic flux meter, which may determine the bending angle of the flexible area by measuring the magnetic flux. In other embodiments, the measurement device may be arranged at the end of the support component 140, and the magnetic component 510 may be arranged at the fixed position of the body.

In some embodiments, the support component 140 may include at least a damping shaft. The at least a damping shaft may be connected in sequence. Each of the at least one damping shafts may include a center shaft. Each of the center shafts may be parallel to each other.

In some embodiments, the damping shaft may deform under the external force as the flexible area deforms. When the external force is smaller than the resistance, the damping shaft may have damping. Thus, the support component 140 may maintain the shape and may not deform to support the flexible screen.

Figure 6:
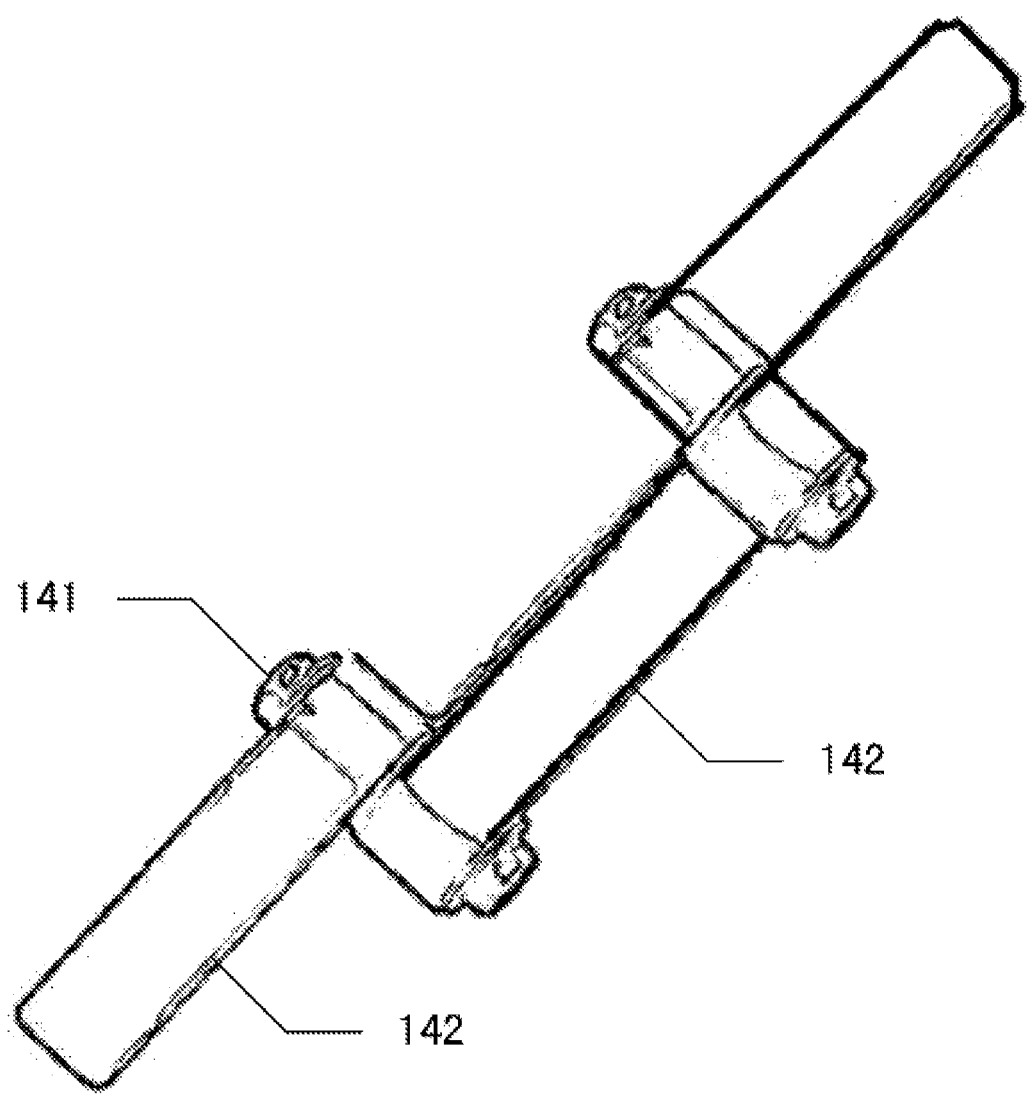
FIG. 6 illustrates a schematic diagram showing a support component according to some embodiments of the present disclosure.

FIG. 6 illustrates a schematic diagram showing the support component 140 according to some embodiments of the present disclosure.

As shown in FIG. 6, the support component 140 includes a plurality of damping shafts. Each damping shaft, for example, includes a center shaft 141 and side arms 142 at both sides of the center shaft 141. Adjacent damping shafts share a side arm 142.

FIG. 6 is only a schematic diagram of the support component 140. The support component 140 may include any structure that can deform with the flexible area and support the flexible area. The present disclosure does not limit the structure of the support component 140. The structure of the support component shown in FIG. 6 is simple and easy to be implemented.

In some embodiments, the body 120 may include a housing, which may be located on a side opposite to the display screen 130. The housing may contact the end of the display screen 130.

Figure 7:
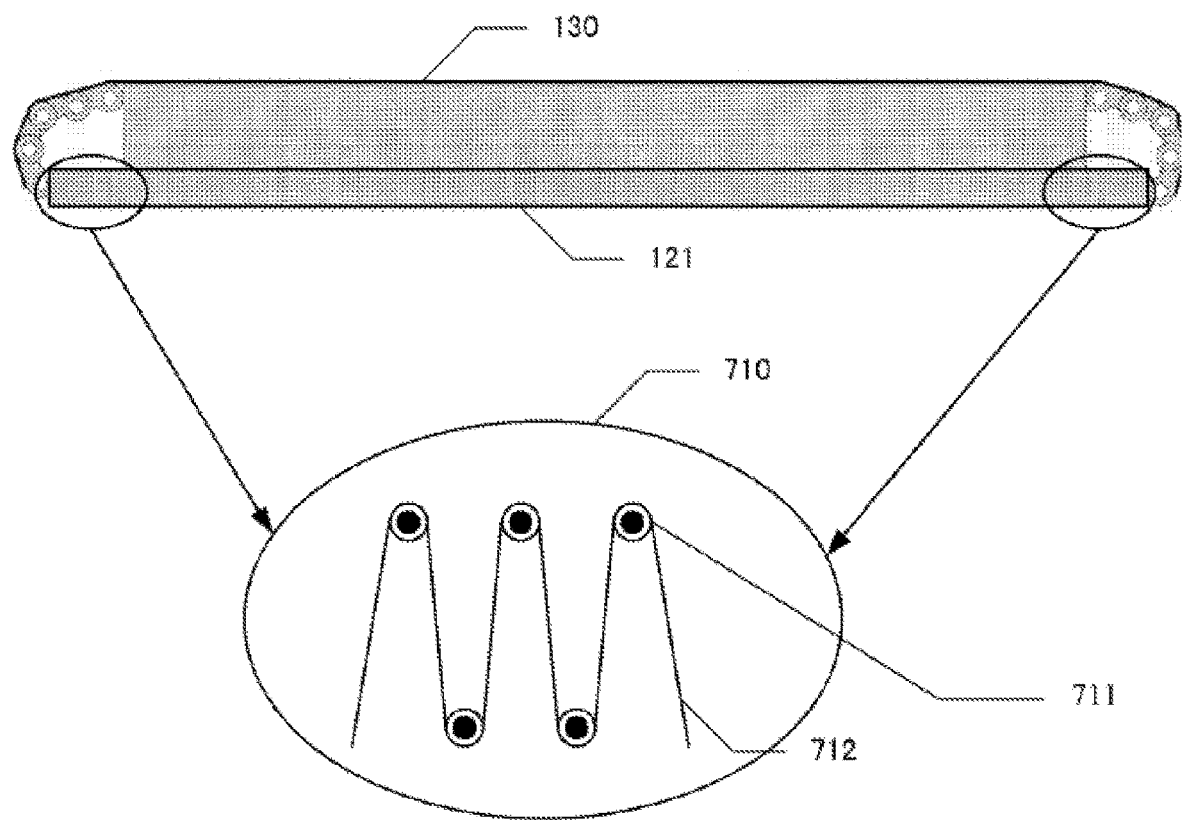
FIG. 7 illustrates a schematic diagram showing that a body contacts an end of a display screen according to some embodiments of the present disclosure.

FIG. 7 illustrates a schematic diagram showing that the housing 121 contacts the end of the display screen 130 according to some embodiments of the present disclosure.

As shown in FIG. 7, the body 120 includes the housing 121, which is located on the side opposite to the display screen 130. The housing 121 contacts the end of the display screen 130.

In some embodiments, the housing 121, for example, includes a retractable structure 710, which is connected to the flexible area. For example, when the operating body bends the flexible area away from the display screen to reduce the width of the electronic device 100, the flexible area may press the retractable structure 710 to cause the retractable structure 710 to retract. The retractable structure 710 may drive the surface of the housing 121 to form wrinkles on the surface of the housing 121. When the operating body expands the flexible area toward the display screen to increase the width of the electronic device 100, the flexible area may pull the retractable structure 710. As such, the retractable structure 710 may drive the surface of the housing 121 to expand the wrinkles of the surface of the body 121.

As shown in FIG. 7, the retractable structure 710, for example, includes a plurality of rotating shafts 711. The plurality of rotating shafts 711, for example, are arranged in an "S" shape. Each rotating shaft 711 is connected to two rotating arms 712. The two rotating arms 712 may rotate about the rotating shaft 711. Adjacent rotating shafts 711 share a rotating arm 712. When the flexible area presses the retractable structure 710, the rotating arms 712 may rotate about the rotating shaft 711, such that an angle between the rotating arm 712 and the rotating shaft 711 may be reduced. Thus, the wrinkles are formed on the surface of the housing 121.

In some embodiments, the housing may absorb the deformation of the dimension of the electronic device caused by the deformation of the flexible area by retracting or extending the retractable structure of the housing. The retractable structure is easy to implement. Further, those of skill in the art may cover the surface of the housing with an external layer, which may not move with the movement of the retractable structure. Therefore, the user may not see the deformation of the housing, and the electronic device may be more aesthetic.

Figure 8:
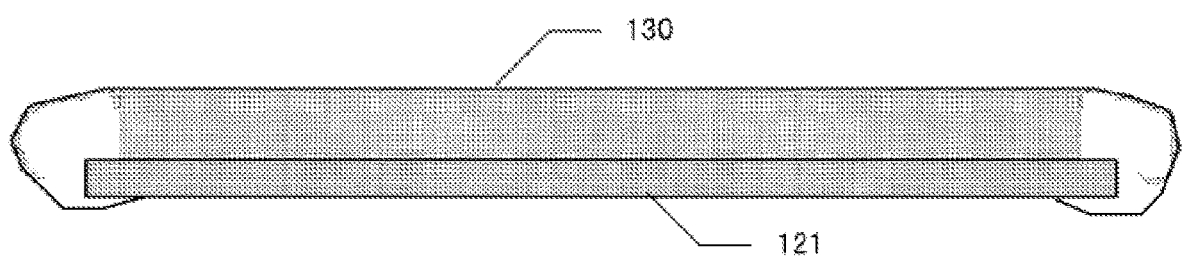
FIG. 8 illustrates a schematic diagram showing that the body contacts the end of the display screen according to some embodiments of the present disclosure.

FIG. 8 illustrates a schematic diagram showing that the housing 121 contacts the end of the display screen 130 according to some embodiments of the present disclosure.

As shown in FIG. 8, the end of the display screen covers the end of the housing 121. When the bending angle of the flexible area is relatively small, the area of the end of the display screen 130 that covers the end of the housing 121 is relatively small. When the bending angle of the flexible area is relatively large, the area of the end of the display screen 130 that covers the end of the housing 121 is relatively large.

Another aspect of the present disclosure provides a control method, which may be applied to the electronic device.

The electronic device may include the body, the display screen, the support component, the angle measurement assembly, and the control assembly. The display screen may include the first portion and the second portion. The surface of the display screen at the first portion may cover the body. The second portion may include the flexible area. The support component may be connected to the surface of the display screen in the flexible area. The support component may be configured to change the shape itself as the flexible area deforms to support the flexible area. The angle measurement assembly may be configured to measure the bending angle of the flexible area. The control assembly may be configured to adjust the display strategy of the display screen according to the bending angle. The display strategy may include at least one of the display areas, the display effect of the image in the display area, or the display style of the user interface.

In some embodiments, the structure of the electronic device may be simpler and easy for the user to operate.

Figure 9:
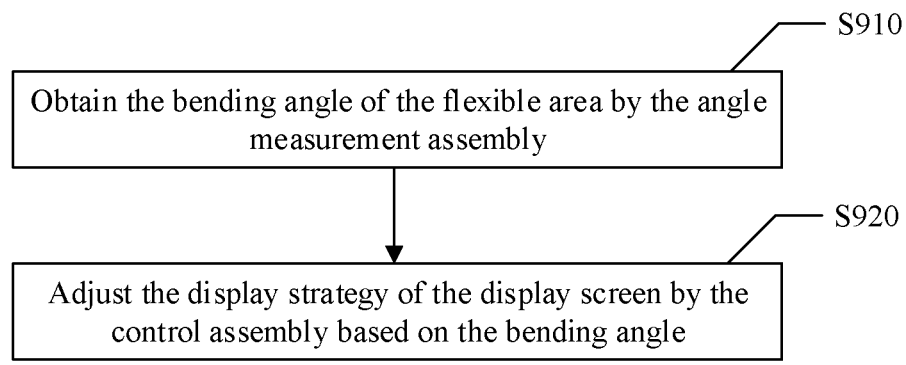
FIG. 9 illustrates a flowchart showing a control method according to some embodiments of the present disclosure.

FIG. 9 illustrates a flowchart showing the control method according to some embodiments of the present disclosure.

As shown in FIG. 9, the control method includes operation S910 and S920.

At S910, the bending angle of the flexible area is obtained by the angle measurement assembly.

At S920, the display strategy of the display screen is adjusted by the control assembly based on the bending angle.

In some embodiments, the display effect of the image in the display area may include at least one of the size of the image, the shape of the image, and the distance between the adjacent images.

In some embodiments, the display styles of the user interface may include the first display style and the second display style. The first display style may match the user feature of the first user type. The second display style may match the user feature of the second user type. When the first user type uses the electronic device, the bending angle may be smaller than a first preset value. When the second user type uses the electronic device, the bending angle may be larger than the second preset value.

In some embodiments, the angle measurement assembly may include the magnetic component and the measurement device. The magnetic component may be configured to generate the magnetic field. The measurement device may be configured to measure the magnetic induction intensity of the magnetic field generated by the magnetic component at the specific position and determine the bending angle of the flexible area according to the magnetic induction intensity. The magnetic component may be arranged in the flexible area, and the measurement device may be located at the fixed position. The fixed position may include the position at the body that may not be affected by the deformation of the flexible area. In other embodiments, the magnetic component may be located at the fixed position, and the measurement device may be located in the flexible area.

Those skilled in the art can understand that various embodiments of the present disclosure and/or the features described in the claims can be grouped and/or combined in various ways, even if such groups or combinations are not explicitly described in the present disclosure. In particular, without departing from the spirit and teachings of the present disclosure, various embodiments of the present disclosure and/or the features described in the claims can be grouped and/or combined in various ways. All these groups and/or combinations are within the scope of the present disclosure.

Although the present disclosure is described by exemplary embodiments of the present disclosure. Those of skill in the art should understand that various changes in form and details can be made to the present disclosure without departing from the spirit and scope of the present disclosure defined by the claims and their equivalents. Therefore, the scope of the present disclosure should not be limited to the above embodiments but determined not only by the appended claims but also by equivalents of the appended claims.

What is claimed is:

1. An electronic device, comprising:
a body;
a display screen including a first portion and a second portion, a display screen surface of the first portion covering the body, and the second portion including a flexible area; and
a support component connected to the display screen surface of the flexible area, the support component being configured to change shape as the flexible area deforms to support the flexible area, wherein,
the body includes a housing located on a side opposite the display screen, contacting an end of the display screen and forming a continued surface with the display screen covering the body, the housing includes a retractable structure connected to the flexible area, driving a surface of the housing to wrinkles to reduce a width of the electronic device or expand wrinkles of the surface of the housing.

2. The electronic device of claim 1, further comprising:
an angle measurement assembly configured to measure a bending angle of the flexible area; and
a control assembly configured to adjust a display strategy of the display screen according to the bending angle, the display strategy including at least one of a display area, a display effect of an image in the display area, or a display style of a user interface.

3. The electronic device of claim 2, wherein the display effect of the image in the display area includes at least one of an image size, an image shape, or a distance between adjacent images.

4. The electronic device of claim 2, wherein the display style of the user interface includes:
a first display style corresponding to a user feature of a first user type; and
a second display style corresponding to a user feature of a second user type;
wherein when a user of the first user type uses the electronic device, the bending angle is smaller than a first preset value, and when a user of the second user type uses the electronic device, the bending angle is larger than a second preset value.

5. The electronic device of claim 2, wherein the angle measurement assembly includes:
a magnetic component configured to generate a magnetic field; and
a measurement device configured to measure magnetic induction intensity of the magnetic field at a specific position and determine the bending angle of the flexible area according to the magnetic induction intensity;
wherein:
the magnetic component is arranged in the flexible area, and the measurement device is located at a fixed position, the fixed position including a position at the body that is not affected by deformation of the flexible area; or
the magnetic component is located at the fixed position, and the measurement device is located in the flexible area.

6. The electronic device of claim 1, wherein:
the support component includes one or more damping shafts connected in sequence;
each of the one or more damping shafts includes a center shaft; and
center shafts are parallel to each other.

7. The electronic device of claim 1, wherein the body includes:
two sidewalls; and
a first surface arranged between the two sidewalls and connected to the sidewalls;
wherein the first portion covers the first surface, and a position of the second portion corresponds to the sidewalls.

8. A control method for managing displays of an electronic device, comprising:
obtaining a bending angle of a flexible area by an angle measurement assembly; and
adjusting a display strategy of a display screen according to the bending angle;
wherein the display strategy includes at least one of a display area, a display effect of an image in the display area, or a display style of a user interface, wherein,
the display screen including a first portion and a second portion, a display screen surface of the first portion covering a body, and the second portion including a flexible area; and
a support component connected to a display screen surface of the flexible area, the support component being configured to change shape as the flexible area deforms to support the flexible area, and the body includes a housing located on a side opposite the display screen, contacting an end of the display screen and forming a continued surface with the display screen covering the body, the housing includes a retractable structure connected to the flexible area, driving a surface of the housing to wrinkles to reduce a width of the electronic device or expands the wrinkles of the surface of the housing.

9. The method of claim 8, wherein the display effect of the image in the display area includes at least one of an image size, an image shape, or a distance between adjacent images.

10. The method of claim 8, wherein the display style of the user interface includes:
a first display style corresponding to a user feature of a first user type; and
a second display style corresponding to a user feature of a second user type;
wherein when a user of the first user type uses the electronic device, the bending angle is smaller than a first preset value, and when a user of the second user type uses the electronic device, the bending angle is larger than a second preset value.

11. The method of claim 8, further comprising:
generating a magnetic field by a magnetic component; and
measuring magnetic induction intensity of the magnetic field at a specific position and determining the bending angle of the flexible area according to the magnetic induction intensity by a measurement device;
wherein:
the magnetic component is arranged in the flexible area, and the measurement device is located at a fixed position, the fixed position including a position at the body that is not affected by deformation of the flexible area; or the magnetic component is located at the fixed position, and the measurement device is located in the flexible area.

\* \* \* \* \*